(12) United States Patent
Hong et al.

(10) Patent No.: US 7,569,629 B2
(45) Date of Patent: Aug. 4, 2009

(54) FLAME RETARDANT POLYCARBONATE RESIN COMPOSITION

(75) Inventors: Sang Hyun Hong, Uiwang-si (KR); Hyuk Jin Jung, Gunpo-si (KR); Jeong Hwan Ku, Gunpo-si (KR)

(73) Assignee: Cheil Industries Inc. (KR)

( * ) Notice: Subject to any disclaimer, the term of this patent is extended or adjusted under 35 U.S.C. 154(b) by 219 days.

(21) Appl. No.: 11/769,136

(22) Filed: Jun. 27, 2007

(65) Prior Publication Data

US 2007/0249768 A1    Oct. 25, 2007

Related U.S. Application Data

(63) Continuation-in-part of application No. PCT/KR2005/001830, filed on Jun. 15, 2005.

(51) Int. Cl.
*C08K 5/5333*    (2006.01)
*C08K 5/523*    (2006.01)
(52) U.S. Cl. .................. 524/123; 524/127; 524/132; 524/141
(58) Field of Classification Search .............. 524/123, 524/127, 132, 141
See application file for complete search history.

(56) References Cited

U.S. PATENT DOCUMENTS

| | | | |
|---|---|---|---|
| 4,692,488 A | 9/1987 | Kress et al. | |
| 5,061,745 A | 10/1991 | Wittmann et al. | |
| 5,204,394 A | 4/1993 | Gosens et al. | |
| 5,206,404 A | 4/1993 | Gunkel et al. | |
| 5,672,645 A | 9/1997 | Eckel et al. | |

FOREIGN PATENT DOCUMENTS

| | | |
|---|---|---|
| EP | 771852 A | 5/1997 |
| JP | 59-202240 | 11/1984 |
| JP | 9-59287 A | 3/1997 |
| JP | 16-59898 A | 2/2004 |
| KR | 2003-47384 A | 6/2003 |

OTHER PUBLICATIONS

International Search Report for corresponding International Application No. PCT/KR2005/001830 mailed on Sep. 30, 2005.

*Primary Examiner*—Peter Szekely
(74) *Attorney, Agent, or Firm*—Summa, Additon & Ashe, P.A.

(57) ABSTRACT

Flame retardant polycarbonate resin composition are disclosed, which can include (A) about 45 to about 95 parts by weight of a thermoplastic polycarbonate resin; (B) about 1 to about 50 parts by weight of a rubber modified vinyl-grafted copolymer; (C) about 0 to about 50 parts by weight of a vinyl copolymer; (D) about 1 to about 30 parts by weight of an organophosphorus compound consisting of ($d_1$) about 1 to about 75% by weight of a phosphonate compound having a specific structure; and ($d_2$) about 25 to about 99% by weight of an oligomeric phosphate ester compound per 100 parts by weight of the sum of (A), (B) and (C); and (E) about 0.05 to about 5 parts by weight of a fluorinated polyolefin resin per 100 parts by weight of the sum of (A), (B) and (C).

20 Claims, No Drawings

FLAME RETARDANT POLYCARBONATE RESIN COMPOSITION

CROSS REFERENCE TO RELATED APPLICATIONS

This non-provisional application is a continuation-in-part application of PCT Application No. PCT/KR2005/001830, filed Jun. 15, 2005, pending, which designates the U.S. and which is hereby incorporated by reference in its entirety, and from Korean Patent Application No. 10-2004-0116618, filed Dec. 30, 2004, which is also hereby incorporated by reference in its entirety.

FIELD OF THE INVENTION

The present invention relates to a polycarbonate thermoplastic resin composition with good flame retardancy, heat resistance and mechanical strength.

BACKGROUND OF THE INVENTION

Polycarbonate and vinyl copolymer resin blend compositions can provide improved processability while maintaining high notched impact strength. Such resin blend compositions should also have good flame retardancy as well as high mechanical strength when used in the production of heat-emitting large-size injection molding products such as computer housings, office supplies, and the like. A halogen-containing flame retardant and an antimony-containing compound can be added to the compositions to impart good flame retardancy.

However, halogen-containing compounds can emit toxic gases generated during combustion. Accordingly, halogen-free resin compositions are used widely.

Phosphate ester-based flame retardants can be used as alternatives to halogen-based flame retardants. U.S. Pat. Nos. 4,692,488 and 5,061,745 are directed to a resin composition comprising aromatic polycarbonate, acrylonitrile-butadiene-styrene graft copolymer, thermoplastic copolymer and monomeric phosphate ester compound.

However, resin compositions including a monomeric phosphate ester compound as a flame retardant can have very poor heat resistance. Further such compositions can exhibit a so called "juicing phenomenon" during molding processes as a result of the flame retardant volatilizing and forming a laminate on the surface of molding product.

The molecular weight of the phosphoric acid ester can be increased to address the juicing problem. The molecular weight of the phosphoric acid ester can be increased by introducing a substitute group to a monomeric phosphate ester compound or using an oligomeric phosphate ester compound.

U.S. Pat. No. 5,206,404 is directed to a composition having stability against acid and hydrolysis by use of alkyl substituted aryl phosphate compound. Further, Japanese Patent Application Laid Open No. 59-202,240 is directed to a process of preparing an oligomeric phosphate ester compound and states that such compounds can be used as a flame retardant in polyamide or polycarbonate.

U.S. Pat. No. 5,204,394 is directed to a flame retardant resin composition comprising an aromatic polycarbonate resin, a styrene-containing copolymer or a graft copolymer, and oligomeric phosphate as flame retardant.

Although the resin composition can improve the juicing phenomenon and heat resistance, the flame retardancy exhibited by the composition can be inferior to that of a resin composition including a monomeric phosphate ester as a flame retardant Accordingly, to maintain good flame retardancy, the resin composition should contain more flame retardant than a resin composition containing a monophosphorous ester as a flame retardant.

U.S. Pat. No. 5,672,645 is directed to a PC/ABS resin composition containing an aromatic polycarbonate, a vinyl copolymer, a graft copolymer, a combination of a monophosphate ester and an oligomeric phosphate ester as flame retardants, and a fluorinated polyolefin, stated to have improved stress cracking resistance.

However, the resin composition still shows juicing phenomenon due to the monomeric phosphate ester compound. Further, the flame retardation ability of the resin composition is lowered due to the oligomeric phosphate ester.

SUMMARY OF THE INVENTION

The present inventors have developed a flame retardant polycarbonate resin composition that includes a polycarbonate resin, a rubber modified vinyl graft copolymer, a vinyl copolymer, a phosphonate compound having a specific structure, an oligomeric phosphate ester compound as a flame retardant and a fluorinated polyolefin resin. The flame retardant polycarbonate resin composition of the invention can have good balance of physical properties such as flame retardancy, impact strength and heat resistance.

The flame retardant polycarbonate resin composition according to the present invention can include (A) about 45 to about 95 parts by weight of a thermoplastic polycarbonate resin; (B) about 1 to about 50 parts by weight of a rubber modified vinyl-grafted copolymer; (C) about 0 to about 50 parts by weight of a vinyl copolymer; (D) about 1 to about 30 parts by weight of an organophosphorus compound consisting of ($d_1$) about 1 to about 75% by weight of a phosphonate compound having a specific structure; and ($d_2$) about 25 to about 99% by weight of an oligomeric phosphate ester compound per 100 parts by weight of the sum of (A), (B) and (C); and (E) about 0.05 to about 5 parts by weight of a fluorinated polyolefin resin per 100 parts by weight of the sum of (A), (B) and (C).

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Polycarbonate Resin

The polycarbonate resin can be prepared by reacting a diphenol represented by the following formula (I) with a phosgene, a halogen formate or a carboxylic acid diester:

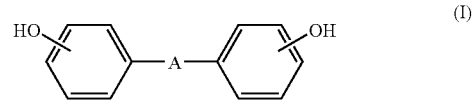

wherein A is a single bond, a $C_{1-5}$ alkylene group, a $C_{1-5}$ alkylidene group, a $C_{5-6}$ cycloalkylidene group, S or $SO_2$.

Examples of the diphenol can include 4,4'-dihydroxy-diphenol, 2,2-bis-(4-hydroxyphenyl)-propane, 2,4-bis-(4- hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, and the like, and mixtures thereof. Advantageous diphenols can include 2,2-bis-(4-hydroxyphenyl)-propane (also referred to as bisphenol A), 2,2-bis-(3,5-dichloro-4-hydroxyphenyl)-propane, 1,1-bis-(4-hydroxyphenyl)-cyclohexane, and the like, and mixtures thereof.

In the present invention, the polycarbonate resin (A) can have a weight average molecular weight ($M_w$) of about 10,000 to 200,000, for example about 15,000 to 80,000.

Suitable polycarbonates incorporated into the composition of the present invention may be branched in a known manner, for example, by incorporating about 0.05 to about 2 mol %, based to total quantity of diphenols used, of tri- or higher functional compounds, for example, those with three or more phenolic groups.

A homopolymer of polycarbonate, a copolymer of polycarbonate or a mixture thereof may be used in this invention.

Some portion of the polycarbonate resin may be replaced with an aromatic polyester-carbonate resin that can be obtained by polymerization in the presence of an ester precursor, such as difunctional carboxylic acid.

In the present invention, the polycarbonate resin can be used in an amount of about 45 to about 95 parts by weight as a base resin.

(B) Rubber Modified Vinyl Graft Copolymer

The rubber modified vinyl graft copolymer according to the present invention can be prepared by graft copolymerizing ($b_1$) about 5 to about 95 parts by weight of a monomer mixture including about 50 to about 95% by weight of styrene, α-methylstyrene, halogen- or alkyl-substituted styrene, $C_{1-8}$ methacrylic acid alkyl ester, $C_{1-8}$ acrylic acid alkyl ester, and the like, and mixtures thereof and about 5 to about 50% by weight of acrylonitrile, methacrylonitrile, $C_{1-8}$ methacrylic acid alkyl ester, $C_{1-8}$ acrylic acid alkyl ester, maleic anhydride, $C_{1-4}$ alkyl- or phenyl N-substituted maleimide, and the like and mixtures thereof onto ($b_2$) about 5 to about 95 parts by weight of a rubber polymer selected from the group consisting of butadiene rubber, acryl rubber, ethylene/propylene rubber, styrene/butadiene rubber, acrylonitrile/butadiene rubber, isoprene rubber, copolymer of ethylene-propylene-diene (EPDM), polyorganosiloxane/polyalkyl(meth)acrylate rubber complex, and the like, and mixtures thereof.

The $C_{1-8}$ methacrylic acid alkyl ester or the $C_{1-8}$ acrylic acid alkyl ester can be obtained by reacting methacrylic acid or acrylic acid respectively with monohydric alcohol with 1 to 8 carbon atoms. Examples of suitable acid alkyl esters include methacrylic acid methyl ester, methacrylic acid ethyl ester, acrylic acid ethyl ester, acrylic acid methyl ester, methacrylic acid propyl ester, and the like, and mixtures thereof.

Examples of suitable rubber modified vinyl graft copolymers (B) can include grafted-copolymers obtained by graft polymerizing a mixture of styrene, acrylonitrile, and optionally (meth)acrylic acid alkyl ester onto butadiene rubber, acryl rubber, or styrene/butadiene rubber.

Other examples of suitable rubber modified vinyl graft copolymers (B) can include grafted-copolymers obtained by graft polymerizing (meth)acrylic acid methyl ester onto butadiene rubber, acryl rubber, or styrene/butadiene rubber.

Yet another example of suitable rubber modified vinyl graft copolymers (B) is an acrylonitrile-butadiene-styrene (ABS) graft copolymer.

The rubber polymer ($b_2$) used to prepare the rubber modified vinyl graft copolymer can have an average particle size of about 0.05 to about 4.0 µm, which can be useful to provide the desired the impact strength and appearance of the product.

The rubber modified graft copolymer according to the present invention can be prepared through a conventional polymerization process such as emulsion, suspension, solution, or bulk process. Among these processes, emulsion or bulk polymerization can be useful, in which the vinyl monomers are added to the rubber polymer using an initiator.

The rubber modified vinyl graft copolymer can be used in an amount of about 1 to about 50 parts by weight.

(C) Vinyl Copolymer

The vinyl copolymer of the present invention can be prepared by copolymerizing about 40 to about 95% by weight of styrene, α-methylstyrene, halogen- or alkyl-substituted styrene, $C_{1-8}$ methacrylic acid alkyl ester, $C_{1-8}$ acrylic acid alkyl ester, and the like, and mixtures thereof and about 5 to about 60% by weight of acrylonitrile, methacrylonitrile, $C_{1-8}$ methacrylic acid alkyl ester, $C_{1-8}$ acrylic acid alkyl ester, maleic anhydride, $C_{1-4}$ alkyl- or phenyl N-substituted maleimide, and the like and mixtures thereof.

The $C_{1-8}$ methacrylic acid alkyl ester or $C_{1-8}$ acrylic acid alkyl ester can be obtained by reacting methacrylic acid or acrylic acid respectively with monohydric alcohol with 1 to 8 carbon atoms. Examples of suitable acid alkyl esters can include methacrylic acid methyl ester, methacrylic acid ethyl ester, acrylic acid ethyl ester, acrylic acid methyl ester, methacrylic acid propyl ester, and the like, and mixtures thereof.

The vinyl copolymer (C) can be produced as by-products when preparing the rubber modified vinyl-grafted copolymer (B). The by-products are mostly produced when a large quantity of monomers are grafted onto a small amount of rubber polymer or when a chain transfer agent is used in excess.

The amount of the vinyl copolymer (C) to be used in this invention does not include the amount of the by-products that might be produced during preparation of the rubber modified vinyl-grafted copolymer (B).

Examples of suitable vinyl copolymers (C) can include those prepared from a monomer mixture of styrene, acrylonitrile, and optionally methacrylic acid methyl ester; a monomer mixture of α-methyl styrene, acrylonitrile, and optionally methacrylic acid methyl ester; or a monomer mixture of styrene, α-methyl styrene acrylonitrile, and optionally methacrylic acid methyl ester. The vinyl copolymer can be prepared by an emulsion, suspension, solution, or bulk process, and can have a weight average molecular weight ($M_w$) of about 15,000 to about 400,000.

Other examples of suitable vinyl copolymers (C) can include those prepared from a mixture of methacrylic acid methyl ester monomers and optionally acrylic acid methyl ester monomers or acrylic acid ethyl ester monomers. The methacrylic acid methyl ester copolymer (C) of the present invention can be prepared by an emulsion, suspension, solution or bulk process, and can have a weight average molecular weight ($M_w$) of about 20,000 to about 250,000.

Yet another suitable copolymer (C) can include a copolymer of styrene and maleic anhydride, which can be prepared by a continuous bulk process and a solution process. The maleic anhydride can be used in the amount of about 5 to about 60% by weight. The copolymer of styrene and maleic anhydride can have a weight average molecular weight ($M_w$) of about 20,000 to about 200,000 and an intrinsic viscosity of about 0.3 to about 0.9.

The styrene monomer for preparation of the component (C) in this invention can be replaced by p-methylstyrene, vinyltoluene, 2,4-dimethylstyrene, or α-methylstyrene.

The vinyl copolymer (C) can be used singly or in combination as a mixture and used in an amount of about 0 to about 50 parts by weight.

(D) Organophosphorus Compound

The organophosphorus compound of the present invention can be a mixture of ($d_1$) about 1 to about 75% by weight of a phosphonate compound; and ($d_2$) about 25 to about 99% by weight of an oligomeric phosphate ester compound.

($d_1$) Phosphonate Compound

The phosphonate compound ($d_1$) according to the present invention can be represented as following Formula (II):

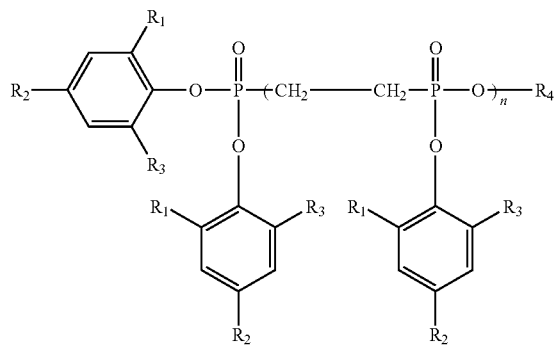

wherein $R_1$, $R_2$ and $R_3$ are independently hydrogen or $C_{1-4}$ alkyl group, $R_4$ is $C_{1-4}$ alkyl group or $C_{6-10}$ aryl group, and n is 0 or 1.

$R_1$, $R_2$ and $R_3$ can be for example hydrogen or methyl, ethyl, propyl, isopropyl, butyl, sec-butyl, t-butyl, or isobutyl, for example, hydrogen or methyl.

$R_4$ is can be methyl, ethyl, propyl, isopropyl, butyl, sec-butyl, t-butyl, isobutyl; phenyl, 2,6-dimethylphenyl, or 4-t-butylphenyl.

Examples of the phosphonate compound ($d_1$) can include methyl diphenyl phosphonate, ethylene bis(diphenyl) phosphonate, and the like, and mixtures thereof. Compounds of Formula (II) in which n is 1 can exhibit improved flame retardancy.

The phosphonate compound ($d_1$) can be used singly or in combination as a mixture. The phosphonate compound ($d_1$) comprises about 1 to about 75% by weight, for example about 1 to about 50% by weight, of organophosphorus compound (D). If the amount of the phosphonate compound is more than about 75% by weight, the flame retardancy and heat resistance of the resin composition can deteriorate. If the amount is less than about 1% by weight, flame retardancy and mechanical strength can degrade.

($d_2$) Oligomeric Phosphate Ester Compound

The oligomeric phosphate ester compound according to the present invention can be represented by the following Formula (III):

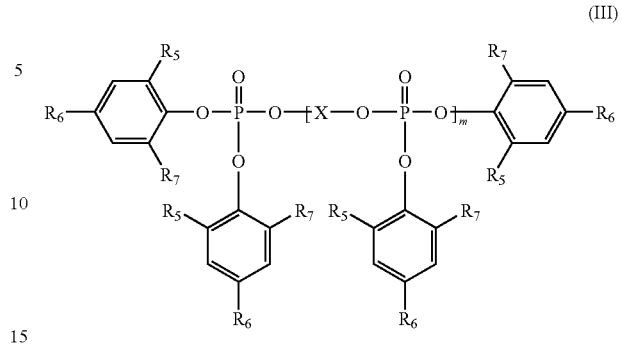

wherein $R_5$, $R_6$, and $R_7$ are independently hydrogen, or $C_{1-6}$ alkyl group; X comprises a $C_{6-20}$ aryl group or an alkyl-substituted $C_{6-20}$ aryl group, for example, a derivative of dialcohol such as resorcinol, hydroquinol and bisphenol-A, and the like and m is an integer from 0 to 5. The average value of m of a mixture of the oligomeric phosphate ester compounds can be 1 to 3.

The oligomeric phosphate ester compound with a different m value can be used alone or as a mixture thereof, which can be prepared in the course of polymerization, or which can be formulated with independent phosphate ester compounds having different m values.

$R_5$, $R_6$, and $R_7$ can be a hydrogen or an alkyl group such as methyl, ethyl, isopropyl, butyl, sec-butyl, t-butyl, or isobutyl group, for example, a hydrogen, methyl, ethyl, isopropyl, or t-butyl group. X can be a derivative from resorcinol or bisphenol-A.

The oligomeric phosphate ester compound ($d_2$) can include about 25 to about 99% by weight, for example, about 50 to about 99% by weight, of organophosphorus compound (D).

The organophosphorous compound (D) of the present invention can be used in an amount of about 1 to about 30 parts by weight per 100 parts by weight of (A)+(B)+(C). If the amount is less than about 1 part by weight, the resin composition can have poor flame retardancy. On the other hand, if the amount is more than about 30 parts by weight, the heat resistance and mechanical strength of the resin composition can deteriorate.

(E) Fluorinated Polyolefin Resin

Examples of suitable fluorinated polyolefin resins useful in the present invention can include polytetrafluoroethylene, polyvinylidenefluoride, tetrafluoroethylene/vinylidenefluoride copolymer, tetrafluoroethylene/hexafluoropropylene copolymer, and ethylene/tetrafluoroethylene copolymer, and the like, and mixtures thereof. The fluorinated polyolefin resin may be used singly or in combination as a mixture.

The fluorinated polyolefin resin (E) according to the present invention can be prepared by a conventional process, for example, the resin can be prepared in an aqueous solvent at about 7 to about 71 kg/cm² and about 0 to about 200° C., for example, about 20 to about 100° C., in the presence of a free radical forming catalyst such as sodium-, potassium-, or ammonium-peroxydisulphate.

The fluorinated polyolefin resin can be used in emulsion state or in powder state. When using an emulsion, a dispersion of the fluorinated polyolefin resin can be useful, but can complicate the process. Accordingly, if the fluorinated polyolefin resin can be uniformly dispersed in the entire resin composition to form the fibrillar network structure, it can be useful to use the fluorinated polyolefin resin in powder state.

Examples of suitable fluorinated polyolefin resins can include polytetrafluoroethylene having an average particle size of about 0.05 to about 1,000 μm and density of about 1.2 to about 2.3 g/cm³.

The fluorinated polyolefin resin can be used in an amount of about 0.05 to about 5.0 parts by weight per 100 parts by weight of (A)+(B)+(C) of the thermoplastic resin composition according to the present invention.

Other additives may be contained in the resin composition of the present invention. Other additives can include lubricants, releasing agents, nuclear agents, antistatic agents, stabilizers, impact modifiers, inorganic fillers, pigments or dyes and the like. The additives can be employed in an amount of about 0 to about 60 parts by weight per 100 parts by weight of (A)+(B)+(C) of the thermoplastic resin composition, for example, about 0.1 to about 40 parts by weight.

The polycarbonate resin composition according to the present invention can be prepared by a conventional method. For example, all the components and additives can be mixed together and extruded through an extruder and can be prepared in the form of pellets.

The polycarbonate thermoplastic resin composition according to the present invention can be useful in the manufacture of housings for electric or electronic goods such as computer housings which require good flame retardancy, heat resistance and impact strength.

The present invention may be better understood by reference to the following examples that are intended for the purpose of illustration and are not to be construed as in any way limiting the scope of the present invention, which is defined in the claims appended hereto. In the following examples, all parts and percentage are by weight unless otherwise indicated.

EXAMPLES

The components used in Examples and Comparative Examples are as follows:

(A) Polycarbonate Resin

Bisphenol-A based polycarbonate with a weight average molecular weight ($M_w$) of about 25,000 is used.

(B) Rubber Modified Vinyl-Grafted Copolymer (B') 58 parts of butadiene rubber latex, 31 parts of styrene, 11 parts of acrylonitrile, and 150 parts of deionized water are mixed. To the mixture, 1.0 parts of potassium oleate, 0.4 parts of cumenhydroperoxide, and 0.3 parts of t-dodecyl mercaptane chain transfer agent are added. The mixture is kept at 75° C. for 5 hours to obtain ABS latex. To the ABS latex, 1% sulfuric acid is added, coagulated and dried to obtain graft copolymer resin in powder form.

(B") A graft copolymer of EXL-2602 (product name) by Kureha Co. is used, in which methacrylic acid methyl ester monomers are grafted onto butadiene rubber.

(C) Vinyl Copolymer 71 parts of styrene, 29 parts of acrylonitrile, 120 parts of deionized water and 0.17 parts of azobisisobutylonitrile (AIBN) are mixed. To the blend, 0.4 parts of t-dodecyl mercaptan chain transfer agent and 0.5 parts of tricalciumphosphate are added. The mixture is suspension polymerized at 75° C. for 5 hours. The resultant composition is washed, dehydrated and dried to obtain styrene-acrylonitrile copolymer (SAN) in powder state.

(D) Organic Phosphorous Compound ($d_1$) phosphonate compound ($d_{11}$) Methyl diphenyl phosphonate produced by Rhodia Co. is used.

($d_{12}$) Ethylene bis(diphenyl phosphonate) is used.

($d_2$) Oligomeric Phosphate Ester Compound

Resorcinol bis(diphenyl) phosphate (product name: PX-200) by Daihachi Chemical IND. is used.

(E) Fluorinated Polyolefin Resin

Teflon (registered trademark) 7AJ by Dupont company is used.

Examples 1-6

The components as shown in Table 1, an antioxidant and a heat stabilizer are added in a conventional mixer and the mixture is extruded through a twin screw extruder with L/D=35 and Φ=45 mm to prepare a product in pellet form. The resin pellets are molded into test specimens for measuring flame retardancy and other properties using a 10 oz injection molding machine at 250° C.

Comparative Examples 1-7

Comparative Example 1 is conducted in the same manner as in Example 1 except that an organic phosphorous compound with the composition outside of the claimed range is used.

Comparative Example 2 is conducted in the same manner as in Example 1 except that only methyl diphenyl phosphonate compound ($d_{11}$) is used as a flame retardant.

Comparative Example 3 is conducted in the same manner as in Example 1 except that only ethylene bis(diphenyl)phosphonate ($d_{12}$) is used as a flame retardant.

Comparative Example 4 is conducted in the same manner as in Example 1 except that only resorcinol bis(diphenyl) phosphate ($d_2$) is used as a flame retardant.

Comparative Example 5 is conducted in the same manner as in Example 5 except that only methyl diphenyl phosphonate compound ($d_{11}$) is used as a flame retardant.

Comparative Example 6 is conducted in the same manner as in Example 5 except that only ethylene bis(diphenyl)phosphonate ($d_{12}$) is used as a flame retardant.

Comparative Example 7 is conducted in the same manner as in Example 5 except that only resorcinol bis(diphenyl) phosphate ($d_2$) is used as a flame retardant.

The specimens prepared in the Examples 1-6 and the Comparative Examples 1-7 are kept at a relative humidity of 50% at 23° C. for 24 hours. The physical properties of the test specimens are measured in accordance with ASTM regulations.

(1) Flame Retardancy: The flame retardancy is measured in accordance with UL94. The test specimens have a thickness of 1.6 mm.

(2) Total Flame Out Time: The total flame out time is the sum of the first flame out time and the second flame out time when five specimens are tested twice.

(3) Vicat Softening Temperature (VST): The vicat softening temperature is measured in accordance with ASTM D1525 under 5 kgf.

(4) Flexural Strength: The flexural strength is measured in accordance with ASTM D790.

The test results of Examples 1-6 and Comparative Examples 1-7 are shown in Table 1 and Table 2 respectively.

TABLE 1

|  |  | Examples |  |  |  |  |  |
|---|---|---|---|---|---|---|---|
|  |  | 1 | 2 | 3 | 4 | 5 | 6 |
| (A) Polycarbonate Resin |  | 75 | 75 | 75 | 75 | 95 | 95 |
| (B) Rubber Modified | (B') | 11 | 11 | 11 | 11 | — | — |
| Vinyl-Grafted Copolymer | (B'') | — | — | — | — | 5 | 5 |
| (C) VinylCopolymer |  | 14 | 14 | 14 | 14 | — | — |
| (D) Organic | $(d_{11})$ | 2 | 4 | — | — | 1 | — |
| Phosphorous | $(d_{12})$ | — | — | 2 | 8 | — | 1 |
| Compound | $(d_2)$ | 12 | 10 | 12 | 6 | 3 | 3 |
| (E) Fluorinated Polyolefin Resin |  | 0.5 | 0.5 | 0.5 | 0.5 | 0.5 | 0.4 |
| UL 94 (1/16") |  | V-0 | V-0 | V-0 | V-0 | V-0 | V-0 |
| Total Flame Out Time (sec) |  | 39 | 35 | 29 | 33 | 26 | 23 |
| VST (° C.) |  | 102 | 101 | 103 | 103 | 129 | 130 |
| Flexural Strength |  | 835 | 845 | 820 | 825 | 950 | 905 |

TABLE 2

|  |  | Comparative Examples |  |  |  |  |  |  |
|---|---|---|---|---|---|---|---|---|
|  |  | 1 | 2 | 3 | 4 | 5 | 6 | 7 |
| (A) Polycarbonate Resin |  | 75 | 75 | 75 | 75 | 95 | 95 | 95 |
| (B) Rubber Modified | (B') | 11 | 11 | 11 | 11 | — | — | — |
| Vinyl-Grafted Copolymer | (B'') | — | — | — | — | 5 | 5 | 5 |
| (C) Vinyl Copolymer |  | 14 | 14 | 14 | 14 | — | — | — |
| (D) Organic | $(d_{11})$ | 12 | 14 | — | — | 4 | — | — |
| Phosphorous | $(d_{12})$ | — | — | 14 | — | — | 4 | — |
| Compound | $(d_2)$ | 2 | — | — | 14 | — | — | 4 |
| (E) Fluorinated Polyolefin Resin |  | 0.5 | 0.5 | 0.5 | 0.5 | 0.4 | 0.4 | 0.4 |
| UL 94 (1/16") |  | V-2 | V-2 | V-1 | V-1 | V-1 | V-1 | V-1 |
| Total Flame Out Time (sec) |  | — | — | 115 | 58 | 60 | 55 | 70 |
| VST (° C.) |  | 96 | 92 | 102 | 103 | 125 | 130 | 130 |
| Flexural Strength |  | 845 | 850 | 840 | 810 | 955 | 920 | 890 |

As shown in Table 1 and Table 2, the resin compositions according to the present invention employing a phosphorous mixture of a phosphonate compound and an oligomeric phosphate ester compound show synergistic effect in flame retardancy and maintaining good heat resistance, compared to those employing a single phosphorous compound or being deviated from claimed range.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A flame retardant polycarbonate resin composition comprising:

(A) about 45 to about 95 parts by weight of a polycarbonate resin;

(B) about 1 to about 50 parts by weight of a rubber modified vinyl-grafted copolymer;

(C) about 0 to about 50 parts by weight of a vinyl copolymer;

(D) about 1 to about 30 parts by weight per 100 parts by weight of the sum of (A), (B) and (C) of a mixture of organophosphorous compounds comprising:

($d_1$) about 1 to about 75% by weight of a phosphonate compound represented by the following Formula (II)

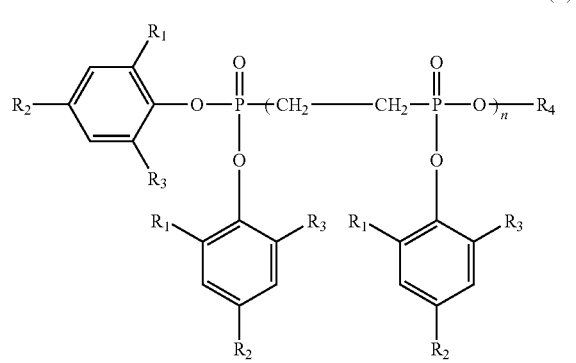

wherein $R_1$, $R_2$ and $R_3$ are independently hydrogen or $C_{1-4}$ alkyl group, $R_4$ is $C_{1-4}$ alkyl group or $C_{6-10}$ aryl group, and n is 0 or 1; and ($d_2$) about 99 to about 25% by weight of an oligomeric phosphate ester compound represented by the following Formula (III)

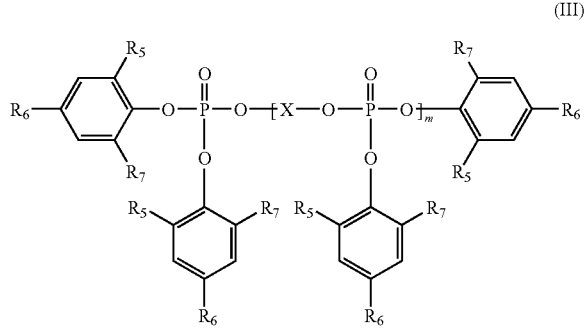

wherein $R_5$, $R_6$, and $R_7$ are independently hydrogen or $C_{1-6}$ alkyl group; X is a $C_{6-20}$ aryl group or an alkyl-substituted $C_{6-20}$ aryl group, and m is an integer from 0 to 5; and (E) about 0.05 to about 5.0 parts by weight of a fluorinated polyolefin resin per 100 parts by weight of (A)+(B)+(C).

2. The flame retardant polycarbonate resin composition of claim 1, wherein said phosphonate compound ($d_1$) is methyl diphenyl phosphonate.

3. The flame retardant polycarbonate resin composition of claim 1, wherein said phosphonate compound ($d_1$) is ethylene bis(diphenyl)phosphonate.

4. The flame retardant polycarbonate resin composition of claim 1, wherein X of Formula (III) is a derivative of dialcohol selected from resorcinol, hydroquinol or bisphenol-A.

5. The flame retardant polycarbonate resin composition of claim 1, comprising a mixture of said oligomeric phosphate ester compounds ($d_2$), wherein m of Formula (III) is an average value of the mixture of the oligomeric phosphate ester compounds and is 1 to 3.

6. The flame retardant polycarbonate resin composition of claim 1, wherein said $R_5$, $R_6$, and $R_7$ of Formula (III) are independently hydrogen, methyl, ethyl, isopropyl or t-butyl group; and X is a derivative of resorcinol or bisphenol-A.

7. The flame retardant polycarbonate resin composition of claim 1, wherein said resin composition further comprises at least one additive selected from the group consisting of lubricants, releasing agents, nuclear agents, antistatic agents, stabilizers, impact modifiers, inorganic fillers, pigments, dyes and mixtures thereof.

8. The flame retardant polycarbonate resin composition of claim 1, wherein n in Formula (II) is 1.

9. The flame retardant polycarbonate composition of claim 1, wherein said rubber modified vinyl-grafted copolymer (B) is prepared by graft-polymerizing ($b_1$) about 5 to about 95% by weight of a monomer mixture comprising about 50 to about 95% by weight of at least one monomer selected from the group consisting of styrene, α-methylstyrene, halogen- or alkyl-substituted styrene, $C_{1-8}$ methacrylic acid alkyl ester, $C_{1-8}$ acrylic acid alkyl ester, and mixture thereof, and about 5 to about 50% by weight of acrylonitrile, methacylonitrile, $C_{1-8}$ methacrylic acid alkyl ester, $C_{1-8}$ acrylic acid alkyl ester, maleic anhydride, $C_{1-4}$ alkyl- or phenyl N-substituted maleimide, or a mixture thereof onto ($b_2$) about 5 to about 95% by weight of a rubber polymer selected from the group consisting of butadiene rubber, acryl rubber, ethylene-propylene rubber, styrene-butadiene rubber, acrylonitrile-butadiene rubber, isoprene rubber, copolymers of ethylene-propylene-diene (EPDM), polyorganosiloxane-polyalkyl (meta)acrylate rubber complex and mixture thereof.

10. The flame retardant polycarbonate composition of claim 1, wherein said vinyl copolymer (C) is prepared by copolymerizing ($c_1$) about 40 to about 95% by weight of at least one monomer selected from the group consisting of styrene, α-methyl styrene, halogen- or alkyl-substituted styrene, $C_{1-8}$ methacrylic acid alkyl ester, $C_{1-8}$ acrylic acid alkyl ester, and mixtures thereof, and ($c_2$) about 5 to about 60% by weight of at least one monomer selected from the group consisting of acrylonitrile, methacrylonitrile, $C_{1-8}$ methacrylic acid alkyl ester, $C_{1-8}$ acrylic acid alkyl ester, maleic anhydride, $C_{1-4}$ alkyl or phenyl N-substituted maleimide, and mixtures thereof.

11. A molded article comprising a flame retardant polycarbonate resin composition, said flame retardant polycarbonate resin composition comprising:
(A) about 45 to about 95 parts by weight of a polycarbonate resin;
(B) about 1 to about 50 parts by weight of a rubber modified vinyl-grafted copolymer;
(C) about 0 to about 50 parts by weight of a vinyl copolymer;
(D) about 1 to about 30 parts by weight per 100 parts by weight of the sum of (A), (B) and (C) of a mixture of organophosphorous compounds comprising:
($d_1$) about 1 to about 75% by weight of a phosphonate compound represented by the following Formula (II)

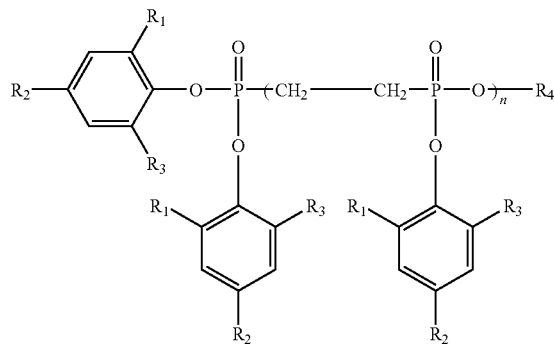

wherein $R_1$, $R_2$ and $R_3$ are independently hydrogen or $C_{1-4}$ alkyl group, $R_4$ is $C_{1-4}$ alkyl group or $C_{6-10}$ aryl group, and n is 0 or 1; and
($d_2$) about 99 to about 25% by weight of an oligomeric phosphate ester compound represented by the following Formula (III)

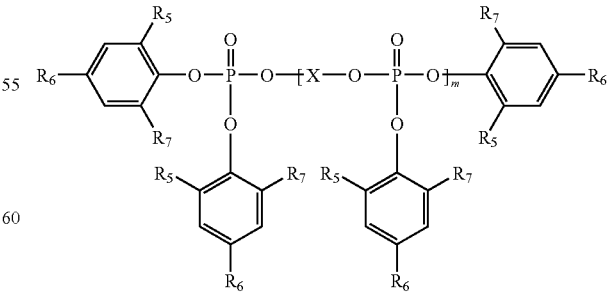

wherein $R_5$, $R_6$, and $R_7$ are independently hydrogen or $C_{1-6}$ alkyl group; X is a $C_{6-20}$ aryl group or an alkyl-substituted $C_{6-20}$ aryl group, and m is an integer from 0 to 5; and (E) about 0.05 to about 5.0 parts by weight of a fluorinated polyolefin resin per 100 parts by weight of (A)+(B)+(C).

12. The molded article of claim 11, wherein said phosphonate compound ($d_1$) is methyl diphenyl phosphonate.

13. The molded article of claim 11, wherein said phosphonate compound ($d_1$) is ethylene bis(diphenyl)phosphonate.

14. The molded article of claim 11, wherein X of Formula (III) is a derivative of dialcohol selected from resorcinol, hydroquinol or bisphenol-A.

15. The molded article of claim 11, comprising a mixture of said oligomeric phosphate ester compounds ($d_2$), wherein m of Formula (III) is an average value of the mixture of the oligomeric phosphate ester compounds and is 1 to 3.

16. The molded article of claim 11, wherein said $R_5$, $R_6$, and $R_7$ are independently hydrogen, methyl, ethyl, isopropyl or t-butyl group; and X is a derivative of resorcinol or bisphenol-A.

17. The molded article of claim 11, wherein said resin composition further comprises at least one additive selected from the group consisting of lubricants, releasing agents, nuclear agents, antistatic agents, stabilizers, impact modifiers, inorganic fillers, pigments, dyes and mixtures thereof.

18. The molded article of claim 11, wherein n in Formula (II) is 1.

19. The molded article of claim 11, wherein said rubber modified vinyl-grafted copolymer (B) is prepared by graft-polymerizing ($b_1$) about 5 to about 95% by weight of a monomer mixture comprising about 50 to about 95% by weight of at least one monomer selected from the group consisting of styrene, α-methylstyrene, halogen- or alkyl-substituted styrene, $C_{1-8}$ methacrylic acid alkyl ester, $C_{1-8}$ acrylic acid alkyl ester, and mixture thereof, and about 5 to about 50% by weight of acrylonitrile, methacylonitrile, $C_{1-8}$ methacrylic acid alkyl ester, $C_{1-8}$ acrylic acid alkyl ester, maleic anhydride, $C_{1-4}$ alkyl- or phenyl N-substituted maleimide, or a mixture thereof onto ($b_2$) about 5 to about 95% by weight of a rubber polymer selected from the group consisting of butadiene rubber, acryl rubber, ethylene-propylene rubber, styrene-butadiene rubber, acrylonitrile-butadiene rubber, isoprene rubber, copolymers of ethylene-propylene-diene (EPDM), polyorganosiloxane-polyalkyl (meta)acrylate rubber complex and mixture thereof.

20. The molded article of claim 11, wherein said vinyl copolymer (C) is prepared by copolymerizing ($c_1$) about 40 to about 95% by weight of at least one monomer selected from the group consisting of styrene, α-methyl styrene, halogen- or alkyl-substituted styrene, $C_{1-8}$ methacrylic acid alkyl ester, $C_{1-8}$ acrylic acid alkyl ester, and mixtures thereof, and ($c_2$) about 5 to about 60% by weight of at least one monomer selected from the group consisting of acrylonitrile, methacrylonitrile, $C_{1-8}$ methacrylic acid alkyl ester, $C_{1-8}$ acrylic acid alkyl ester, maleic anhydride, $C_{1-4}$ alkyl or phenyl N-substituted maleimide, and mixtures thereof.

* * * * *

UNITED STATES PATENT AND TRADEMARK OFFICE
CERTIFICATE OF CORRECTION

PATENT NO. : 7,569,629 B2
APPLICATION NO. : 11/769136
DATED : August 4, 2009
INVENTOR(S) : Sang Hyun Hong, Hyuk Jin Jung and Jeong Hwan Ku It is certified that error appears in the above-identified patent and that said Letters Patent is hereby corrected as shown below:

Title Page, item (30) should read:

Foreign Application Priority Data

Dec. 30, 2004 (KR) .......................... 10-2004-0116618

Signed and Sealed this

Tenth Day of November, 2009

David J. Kappos
*Director of the United States Patent and Trademark Office*